US011888884B2

(12) United States Patent
Habib et al.

(10) Patent No.: US 11,888,884 B2
(45) Date of Patent: Jan. 30, 2024

(54) CYBER THREAT INTELLIGENCE SYSTEM INFRASTRUCTURE

(71) Applicant: BCE INC., Verdun (CA)

(72) Inventors: Hakem Habib, Oshawa (CA); Kushwant Singh Gidda, Ottawa (CA); Corey Still, Ottawa (CA); Maciej Broda, Ottawa (CA); Amir-Hossein Razavi, Manotick (CA); Matthew Kitching, Ottawa (CA); Marc-Andre Hervieux, St-Lazare (CA); James Skinner, Ajax (CA); Mahamudul Chowdhury, Pickering (CA); Shaffiq Dhanji, Richmond Hill (CA)

(73) Assignee: BCE Inc., Verdun (CA)

( * ) Notice: Subject to any disclaimer, the term of this patent is extended or adjusted under 35 U.S.C. 154(b) by 698 days.

(21) Appl. No.: 15/850,901

(22) Filed: Dec. 21, 2017

(65) Prior Publication Data
US 2018/0191767 A1    Jul. 5, 2018

Related U.S. Application Data

(60) Provisional application No. 62/440,212, filed on Dec. 29, 2016.

(51) Int. Cl.
*H04L 9/40* (2022.01)
*H04L 41/069* (2022.01)
*H04L 43/062* (2022.01)

(52) U.S. Cl.
CPC ...... *H04L 63/1433* (2013.01); *H04L 63/1425* (2013.01); *H04L 41/069* (2013.01); *H04L 43/062* (2013.01)

(58) Field of Classification Search
CPC ............. H04L 63/1433; H04L 63/1425; H04L 41/069; H04L 43/062
See application file for complete search history.

(56) References Cited

U.S. PATENT DOCUMENTS

2012/0304130 A1* 11/2012 Rueff .................... H04L 43/045
715/850
2016/0072831 A1* 3/2016 Rieke .................... H04L 43/062
726/1

FOREIGN PATENT DOCUMENTS

WO     2016036485     3/2016

OTHER PUBLICATIONS

Official Action from Canadian Patent Application No. 2,989,897 dated Dec. 11, 2019.

* cited by examiner

*Primary Examiner* — Jeffrey D. Popham

(57) ABSTRACT

A cyber threat intelligence infrastructure allows processing of network data to enrich captured data with data from different sources to identify possible and/or actual cyber threats.

20 Claims, 7 Drawing Sheets

CYBER THREAT INTELLIGENCE SYSTEM INFRASTRUCTURE

RELATED APPLICATIONS

The current application claims priority to U.S. Provisional Patent Application 62/440,212 Filed Dec. 29, 2016, the entire contents of which are incorporated herein by reference.

TECHNICAL FIELD

The current disclosure relates to cyber security, and in particular to a scalable cyber threat intelligence system infrastructure.

BACKGROUND

Network security is increasingly important to individuals as well as organizations. Organizations may monitor network traffic at strategic locations, such as at a publicly accessible gateway in order to identify potential security threats. Security threats may be determined based on computing devices communicating with known security risks as well as comparing network traffic with signatures of traffic associated with known threats.

While network monitoring for potential threats within an organization is an important aspect of threat detection and mitigation, it is desirable to have a scalable infrastructure that can provide network wide cyber threat intelligence in order to leverage intelligence from across multiple organizations and individuals.

BRIEF DESCRIPTION OF THE DRAWINGS

Further features and advantages of the present disclosure will become apparent from the following detailed description, taken in combination with the appended drawings, in which.

DETAILED DESCRIPTION

Figure 1:
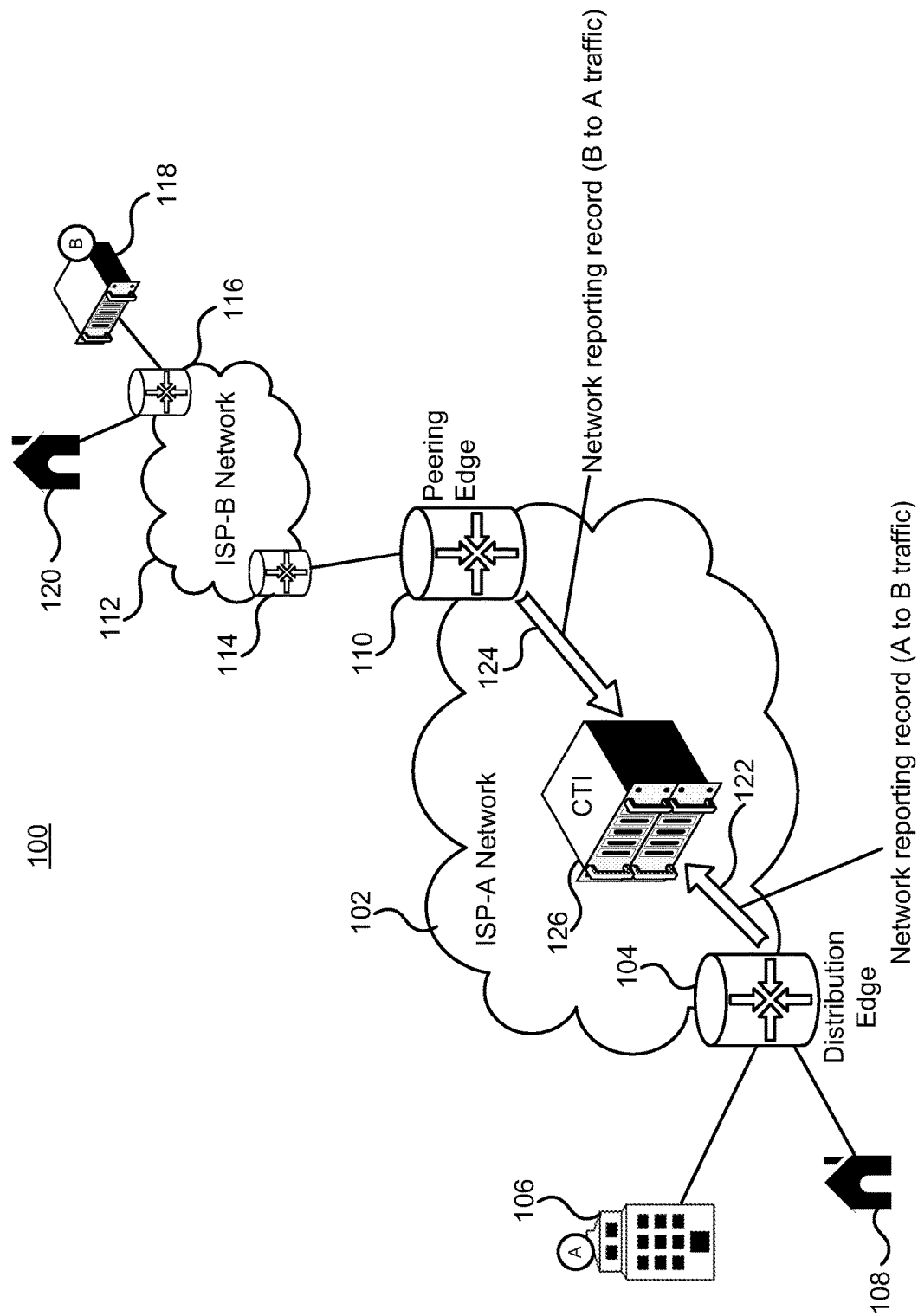
FIG. 1 depicts a network environment incorporating a cyber-threat intelligence infrastructure.

In accordance with the present disclosure there is provided a cyber-threat intelligence (CTI) infrastructure comprising: a plurality of network devices each collecting network reporting information; a collection of at least one CTI server, the collection configured for: receiving the network reporting information collected by the plurality of network devices; enriching the network reporting information with enrichment data; and processing the enriched network reporting information to identify potential security vulnerabilities.

In a further embodiment of the CTI infrastructure, enriching the network reporting information comprises adding one or more tags of the enrichment data to the network reporting information based at least in part on a portion of the network reporting information.

In a further embodiment of the CTI infrastructure, the portion of the network reporting information is one or more of: a source IP address; a destination IP address; a source port number; and a destination port number.

In a further embodiment of the CTI infrastructure, adding one or more tags of the enrichment data comprises: determining informational data associated with the portion of the network reporting information from the enrichment data; and adding the determined informational data to the network reporting information as the one or more tags.

In a further embodiment of the CTI infrastructure, one or more of the source IP address, and the destination IP address is determined dynamically.

In a further embodiment of the CTI infrastructure, adding one or more tags of the enrichment data comprises: identifying a traffic direction for the network reporting information; and adding the identified traffic direction to the network reporting information as the one or more tags.

In a further embodiment of the CTI infrastructure, identifying the traffic direction is based on one or more of the source port number, and the destination port number.

In a further embodiment of the CTI infrastructure, the a collection of the at least one CTI server is further configured for: adding the received network reporting information to a first message queue, wherein enriching further comprises: retrieving network reporting information from the first message queue; and adding the enriched network reporting information to a second message queue.

In a further embodiment of the CTI infrastructure, the a collection of the at least one CTI server is further configured for: retrieving the enriched network reporting information from the second message queue; further enriching the enriched network reporting information; and adding the further enriched network reporting information to a third message queue.

In a further embodiment of the CTI infrastructure, the further enriching comprises one or more of informational data tagging, client/server data tagging, and dynamic information tagging.

In a further embodiment of the CTI infrastructure, the collection of the at least one CTI server is further configured for summarizing the enriched network reporting information for the processing step.

In a further embodiment of the CTI infrastructure, the enriched network reporting information is processed by threat analysis components.

In a further embodiment of the CTI infrastructure, one or more potential security vulnerabilities is retrieved by an alerts component that generates one or more alerts.

In a further embodiment of the CTI infrastructure, the network reporting information comprises one or more of NetFlow data, firewall information, IPFIX data, and DNS data.

In accordance with the present disclosure there is further provided a method for processing network information comprising: receiving at an ingestion service network reporting information collected by a plurality of network devices; at an enrichment service, enriching the network reporting information with enrichment data; and at a threat detection service, processing the enriched network reporting information to identify potential security vulnerabilities.

In a further embodiment of the method, enriching the network reporting information comprises adding one or more tags of the enrichment data to the network reporting information based at least in part on a portion of the network reporting information.

In a further embodiment of the method, the portion of the network reporting information is one or more of: a source IP address; a destination IP address; a source port number; and a destination port number.

In a further embodiment of the method, adding one or more tags of the enrichment data comprises: determining informational data associated with the portion of the network reporting information from the enrichment data; and adding the determined informational data to the network reporting information as the one or more tags.

In a further embodiment of the method, one or more of the source IP address, and the destination IP address is determined dynamically.

In a further embodiment of the method, adding one or more tags of the enrichment data comprises: identifying a traffic direction for the network reporting information; and adding the identified traffic direction to the network reporting information as the one or more tags.

In a further embodiment of the method, identifying the traffic direction is based on one or more of the source port number, and the destination port number.

In a further embodiment, the method further comprises: adding the received network reporting information to a first message queue, wherein enriching further comprises: retrieving network reporting information from the first message queue; and adding the enriched network reporting information to a second message queue.

In a further embodiment, the method further comprises: retrieving the enriched network reporting information from the second message queue; further enriching the enriched network reporting information; and adding the further enriched network reporting information to a third message queue.

In a further embodiment of the method, wherein the further enriching comprises one or more of informational data tagging, client/server data tagging, and dynamic information tagging.

In a further embodiment, the method further comprises summarizing the enriched network reporting information for the processing step.

In a further embodiment of the method, the enriched network reporting information is processed by threat analysis components.

In a further embodiment of the method, one or more potential security vulnerabilities is retrieved by an alerts component that generates one or more alerts.

In a further embodiment of the method, the network reporting information comprises one or more of NetFlow data, firewall information, IPFIX data, and DNS data.

Internet service providers (ISPs) or other network providers provide a network that connects organizations and individuals to each other as well as to network services. A large amount of data may travel over an ISP's network, which may be useful in detecting potential threats, or vulnerabilities. However, leveraging the data in a meaningful manner presents a challenge due to the amount of data required to be processed. A flexible cyber-threat intelligence (CTI) infrastructure is described further herein that is scalable for processing extremely large datasets to provide useful processing of the network data.

FIG. 1 depicts a network environment incorporating a cyber-threat intelligence infrastructure. The environment 100 comprises a first ISP network 102 that comprises a plurality of distribution edge servers or devices 104 that connect end users to the ISP network 102. The end users are depicted as including an organization 106 as well as a home user 108. The first ISP network 102 may be connected to other networks at peering edge servers or devices 110. The second network 112 is similar to that of the first network 102 and may comprise a plurality of peering edge devices 114 and distribution edge devices 116 that connect customers of the second ISP to the second network 112. The customers may comprise a combination of web service providers 118, home customers 120 etc.

As depicted in FIG. 1 the edge devices 104, 110 generate network reporting information for network traffic flowing through the edges, which is referred to below as NetFlow data although other types of network reporting information may be collected. For example if a user at the organization A 106 accesses the web service B 118, network data will pass from organization A 106, to the distribution edge 104, through ISP A's network 102 to the peering edge 110 that connects ISP A's network 102 to ISP B's network through the respective peering edge 114. ISP B's network directs the traffic to the appropriate destination, namely server B 118. The server B 118, in this example, is a server acting as a destination and the organization A 106 is a client acting as a source. Server B 118 responds, for example, with requested data, that travels over ISP B's network, to the peering edge 110 of ISP A's network 102, through the distribution edge 104 and to the organization A 106. Both the distribution edge and peering edges 104, 110, or devices associated with them, generate NetFlow data 122, 124 from the traffic carried over the edge devices. It will be appreciated that NetFlow data may also be generated by non-edge network devices located within the ISP's network. As depicted, the distribution edge device 104 provides a NetFlow record of the traffic from point A to point B, while the peering edge device 110 provides a NetFlow record of the traffic from B to A. The NetFlow data is provided by the CTI processing infrastructure 126, which is depicted as a plurality of servers located with the ISP network 102. Although depicted as a collection of servers located within the ISP network 102, the CTI infrastructure 126 may be provided by a collection of servers outside of the ISP network 102, or as a collection of servers both inside and outside of the ISP network 102. The CTI processing infrastructure allows for processing the large volume of data generated from the network traffic. Although depicted as receiving NetFlow data from the first ISP network 102, the CTI processing infrastructure 126 may receive data from other networks as well. Although described as receiving NetFlow data, the CTI processing infrastructure 126 may receive additional or alternative network reporting information including, firewall information, IPFIX data, DNS data etc. The CTI infrastructure comprises a plurality of data collection points, such as the distribution and peering edges, that provide data to the processing infrastructure 126 that processes the received data in order to provide cyber threat intelligence information.

Figure 2:
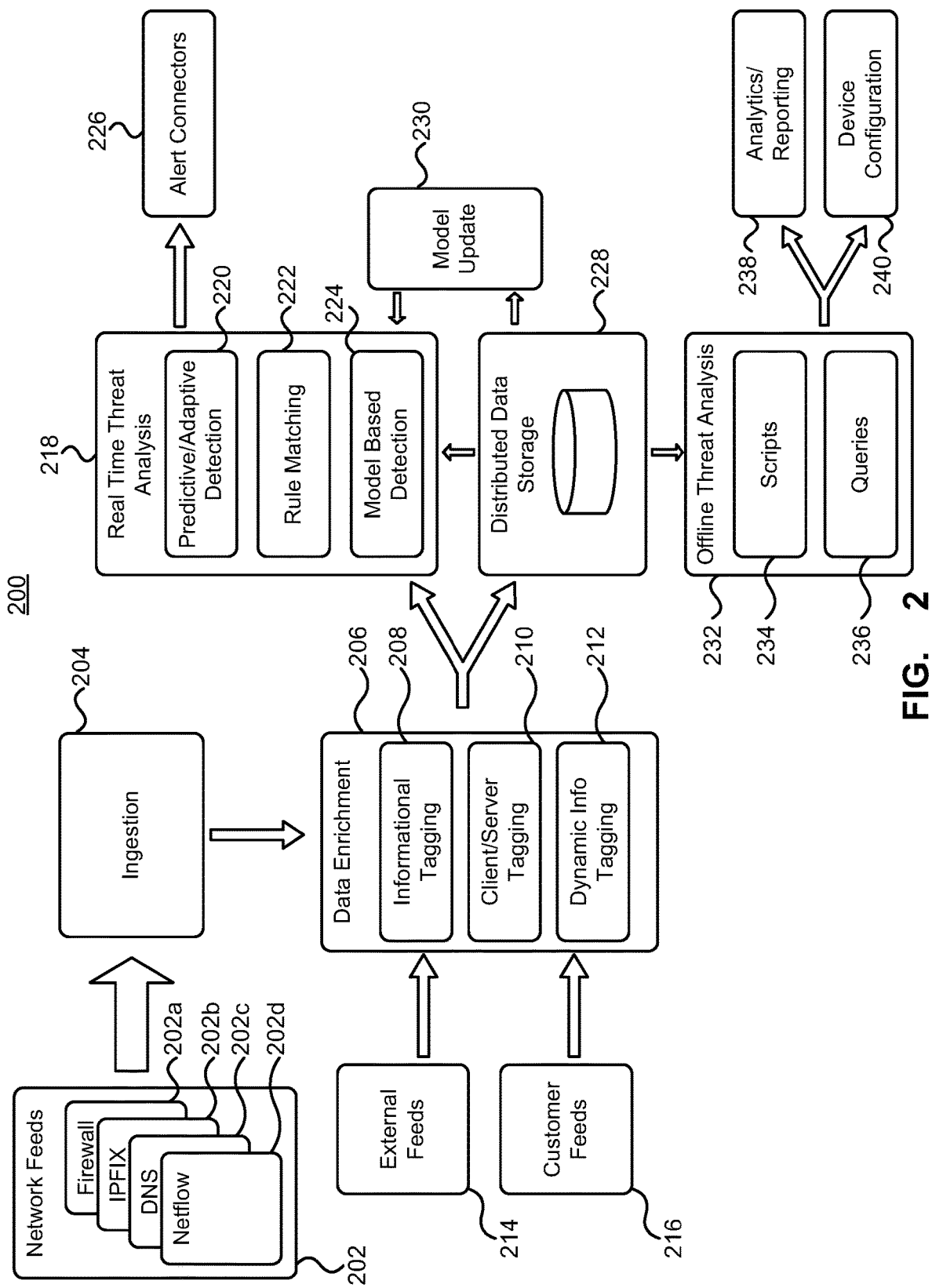
FIG. 2 depicts components of a cyber-threat intelligence infrastructure.

FIG. 2 depicts components of a cyber-threat intelligence infrastructure. The infrastructure 200 comprises a plurality of different data network feeds 202 that are collected by, or otherwise generated by, network devices. The network feeds may include, for example firewall data 202a, IPFIX data 202b, DNS data 202c, NetFlow data 202d etc. The network feeds are provided to an ingestion component 204 that may decode the data, filter the data and perform load balancing for further processing of the data. The ingestion component 204 may be provided on a single server or may be distributed across multiple servers.

The ingested data from the network feeds is provided to a data enrichment component 206. The data enrichment component may combine different data sources together and tag data with new fields and/or tags. The data enrichment component 206 may receive data from external feeds 214 as well as customer feeds 216. The external feeds 214 may be sources of data provided by other parties. For example, a feed may be provided that provides information about IP addresses known to be associated with malicious content. Customer feeds 216 may be data provided by customers and may specify various information, such as expected traffic flows or patterns, user information, etc.

The data enrichment component 206 may enrich the network feed data in various ways. The data enrichment component 206 is depicted as comprising an informational tagging component 208, a client/server tagging component 210, and a dynamic information tagging component 212. The informational tagging component 208 may tag the data feed records with additional information. For example, an external data feed may provide information regarding an organization that is associated with an IP address or block of IP addresses. The informational tagging component 208 may tag data records with the organizational information. The client/server tagging component 210 attempts to tag the data records with whether the source and destination act as a client or server in the communication data. The client/server tagging component 210 may attempt to identify a client or server based on the port numbers used for communicating. Generally, a server uses fixed port numbers and clients use dynamic port numbers. The port numbers may be used as an indicator of whether a connection end point is acting as a client or as a server. The dynamic information tagging component 212 may be used to tag the data records with dynamic information such as dynamic IP addressed assigned to a user.

The enriched data is passed from the data enrichment component 206 to a real time threat analysis component 218 as well as a distributed data storage component 228. The data storage component 228 provides a scalable storage service. The real time threat analysis component 218 may comprise a predictive/adaptive detection component 220, a rules matching component 222, and a model based detection component 224. The various components of the real time threat analysis component 218 process the enriched data in order to identify possible threats or vulnerabilities from the data traffic. The results of the real time threat analysis component 218 may be provided to an alert connector component 226 that can provide alerts based on the analysis results. For example, the alert connectors may send emails, texts or otherwise generate a message for informing a user of the potential threat. A model update component 230 may be used to update a model used by the model based detection component 224. The model update component 230 may use data information stored in the storage component 228.

The data stored in the distributed storage 228 may be processed by an offline threat analysis component 232. The offline analysis component 232 may use scripts 234 and/or queries 236 for generating further threat analysis. The results of the offline processing may be provided to an analytics and reporting component 238 that may provide an interface to a user for assessing the analysis results. The results may also be provided to a device configuration component 240 that may configure other network devices, such as firewalls, gateways, etc. based on the threat analysis.

Figure 3:
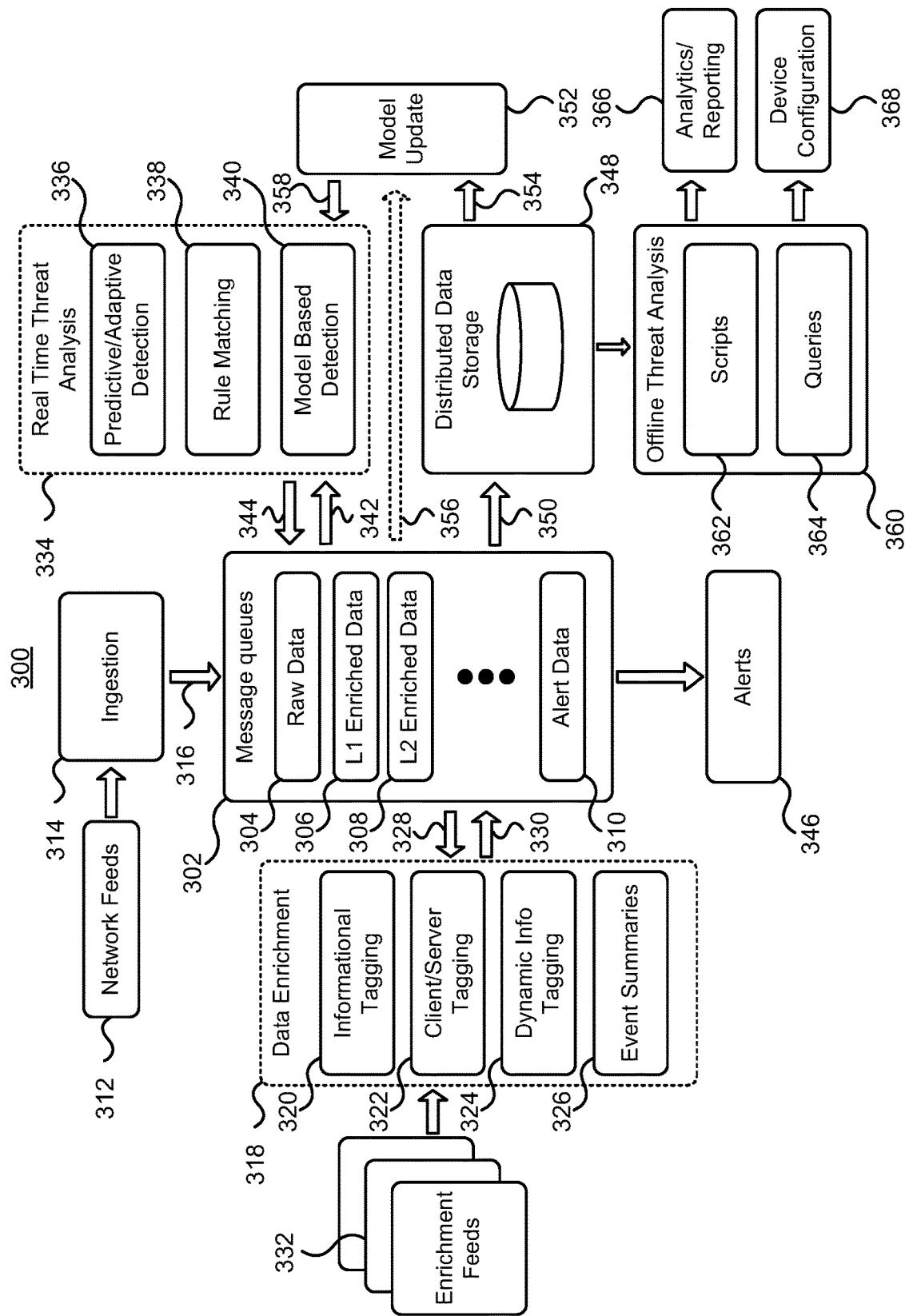
FIG. 3 depicts components of a further cyber-threat intelligence infrastructure.

FIG. 3 depicts components of a further cyber-threat intelligence infrastructure. The system 300 is similar in functionality to the system 200; however, the system 300 includes a plurality of message queues 302 connecting different components together. The message queues 302 may provide distributed message queues that can receive and store messages from various sources and provide the messages to one or more destinations. The message queues 302 may store and retrieve messages in an order they are received. The messages may be stored in a respective queue for a set period of time, such as a day, week, month, etc. Further, the messages remain on the queues after the messages have been retrieved and delivered to one or more destinations. Accordingly, multiple destinations may retrieve the same messages from the queue. As depicted, the message queues 302 may include, for example, a raw data queue 304, a level 1 enrichment data queue 306, a level 2 enrichment data queue 308, an alert data queue 310 as well as other possible queues.

The system 300 receives network feeds 312 at an ingestion component 314. As described above, the network feeds 312 may provide various network traffic events or data and may comprise NetFlow data, DNS data, IPFIX data, firewall data, as well as other network related information such as access logs, etc. Although depicted as a single component, the ingestion component 314 may comprise multiple different ingestion components for ingesting different types of network feeds. The ingestion component 314 receives the network feeds and generates network traffic event messages for each of the events or records of the network feeds. Generating the network traffic event messages is a relatively low complexity process in order to quickly ingest large volumes of network feed data quickly. The generated network traffic event messages are provided to the message queues 302, depicted schematically by arrow 316, which may be stored in a raw message queue 304.

Once the network traffic event messages are added to the raw data queue 304, the messages are available for retrieval and processing by various components. The processing components, may include, for example one or more data enrichment components 318, real-time threat analysis components 334, alerts component 346 and distributed data storage components 348, model update components 352 as well as a variety of different components that may process the data on the message queues 302.

The data enrichment components 318, may include various individual enrichment components including an informational tagging component 320, a client/server tagging component 322, dynamic information tagging component 324 and an event summaries component 326. It will be appreciated that the depicted enrichment components are only illustrative and other enrichment components may be provided. Each of the enrichment components may retrieve messages from one or more of the message queues 302, depicted by arrow 328, and enrich the message with appropriate data. Each of the enrichment components may provide the enriched data back to the message queues 302, depicted as arrow 330, for adding to an appropriate message queue, or the enriched data may be passed to another enrichment component for further enrichment. For example, the informational tagging component 320 may retrieve network traffic event messages from the raw data queue 304 and process the messages to add additional tags to the data based on data from one or more enrichment feeds 332. As an example, the informational tagging component may retrieve raw network traffic event messages from the raw queue and add tags or fields of information to the messages such as company or organization names associated with IP addresses in the raw data, geolocations of IP addresses, applications associated with ports and protocols of the raw data etc. The informational tagging component 320 may then provide the enriched data back to the message queues for storage on a first one of the enriched data queues, such as the L1 enriched data queue 306. The client/server tagging component 322 may retrieve messages from the L1 enriched data queue 306 and add additional information indicative of whether the network traffic of the message is from a client or from a server. The client/server tagging component 322 may then provide the enriched data for storage to another message queue such as the depicted L2 enriched data queue 308. Similarly, a dynamic information tagging component 324 may retrieve messages from one or more of the message queues and enrich the messages with dynamic information, such as DHCP information. Additional enrichment components may include, for example, an event summaries component 326 that can retrieve messages and generate summaries of a plurality of the messages.

The messages stored on the different message queues 302, including the raw network traffic events, enriched traffic events and summarized events, may be retrieved, depicted by arrow 342, and further processed by real time threat analysis components 334. The real time threat analysis components 334 may include a predictive/adaptive detection component 336, a rule matching component 338 and a model based detection component 340. The real time threat analysis components 334 may retrieve messages from one or more of the message queues 302 and process it in order to identify potential risk threats. The real time threat analysis components 334 may generate one or more threat alerts that can be added to an alert data message queue 310, depicted by arrow 344. The generated threat alerts may be retrieved by an alerts component 346 that retrieves the alert data and may generate one or more alerts which may include, for example, providing notifications to one or more security personnel.

The message queues 302 may act as a temporary storage for the messages. The length of time the messages may remain on a particular message queue may vary from days, weeks, months or more. When it is desirable to store data from one or more of the queues, a distributed data storage component 348 may retrieve the messages, depicted by arrow 350, from the message queues 302, depicted by arrow 354, and store the information in one or more repositories. The data may be stored using various storage techniques including, for example data lakes, data warehouses, databases, etc.

The stored data may be used by other components. As depicted, a model update component 352 may retrieve stored data, depicted by arrow 354, and process the data to update detection models, depicted by arrow 358, used by the model based detection component 358. Although depicted as using data from the distributed data stores, the model update component 352 may additionally or alternatively use data retrieved from the message queues 302, depicted by dashed arrow 356, in order to update the threat detection models.

In addition to the model update component 352, the stored data may be processed by an offline threat analysis component 360 that may allow scripts 362 and queries 364 to be run against the stored data. Results from the scripts 362 and queries 364 may be provided to analytics/reporting components 366 that may allow the results to be analysed and visualized by security personnel. The results from the scripts 362 and queries 364 may also be provided to device configuration components 368 that can configure network devices such as firewalls, routers, etc. based on the results of the offline threat analysis.

Figure 4:
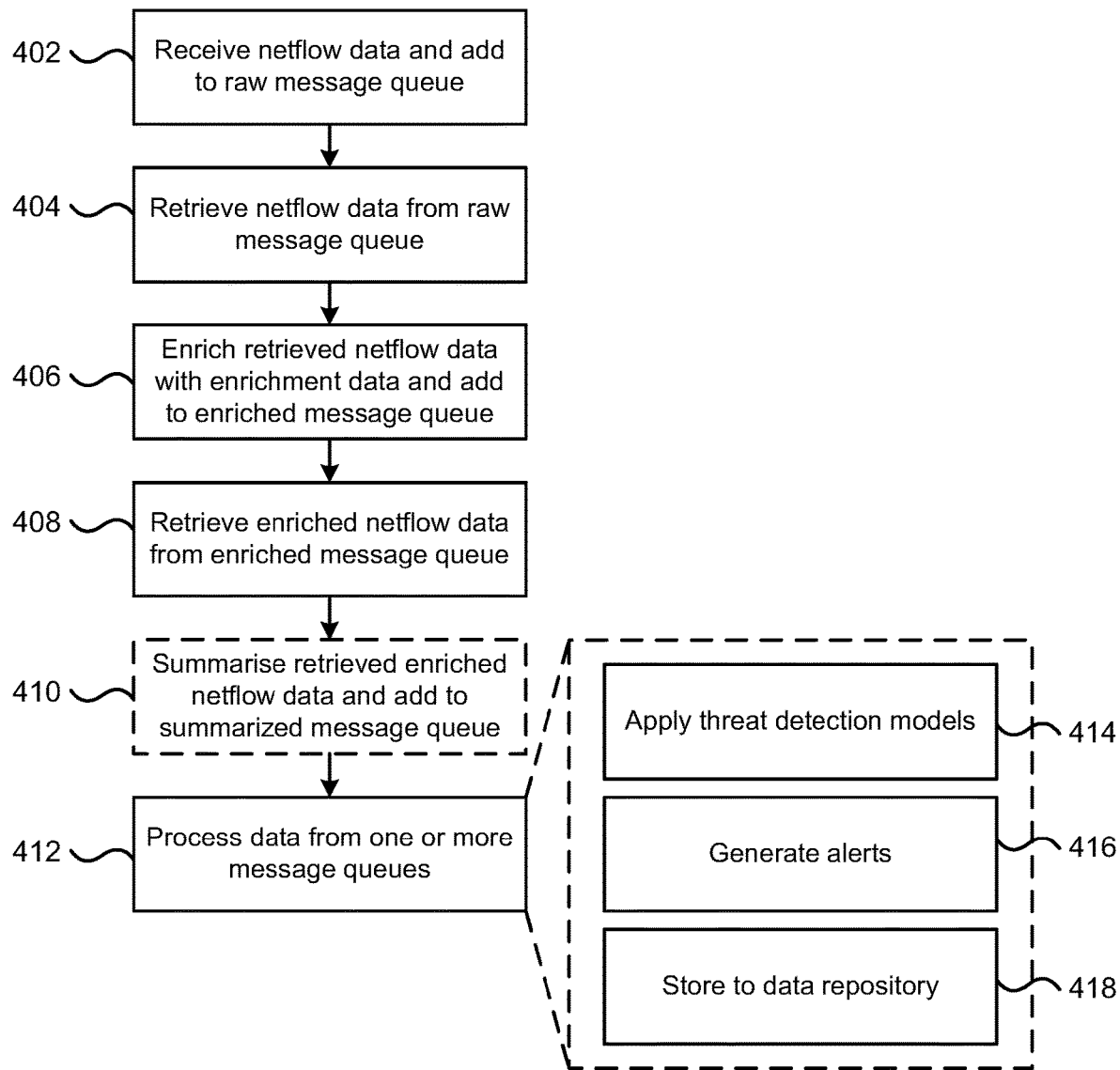
FIG. 4 depicts a method of processing network information in the cyber-threat intelligence infrastructure of FIG. 3.

FIG. 4 depicts a method of processing network information in the cyber-threat intelligence infrastructure of FIG. 3. The method 400 receives NetFlow data, and possibly other network related events, and adds the data to a raw message queue (402). The NetFlow data may be received at an ingestion component from a plurality of network devices, including edge devices and provided to a messaging queue service. The NetFlow data may be retrieved from the raw message queue (404). The data may be retrieved by an enrichment service. The enrichment service enriches the retrieved NetFlow data with enrichment data and adds the resulting data to an enriched message queue (406). The enriched data is retrieved from the enriched message queue (408). The enriched data may be summarized and added to a summarized message queue (410). It will be appreciated that the data does not need to be summarized for all processes, however in certain scenarios, summarizing the data, for example providing a summary of traffic data over different ports of a particular computer, may allow further processing or identification of potential threats. Further, although depicted as summarizing enriched data, it is possible for the raw data to be used in summarizing the data. The method 400 processes data from one or more of the message queues (412), including the raw data queue, enriched data queue, and summarized data queue. Although the processing may take numerous forms, it may include for example, applying one or more threat detection models (414), generate alerts (416), and/or store information to one or more data repositories (418).

Figure 5:
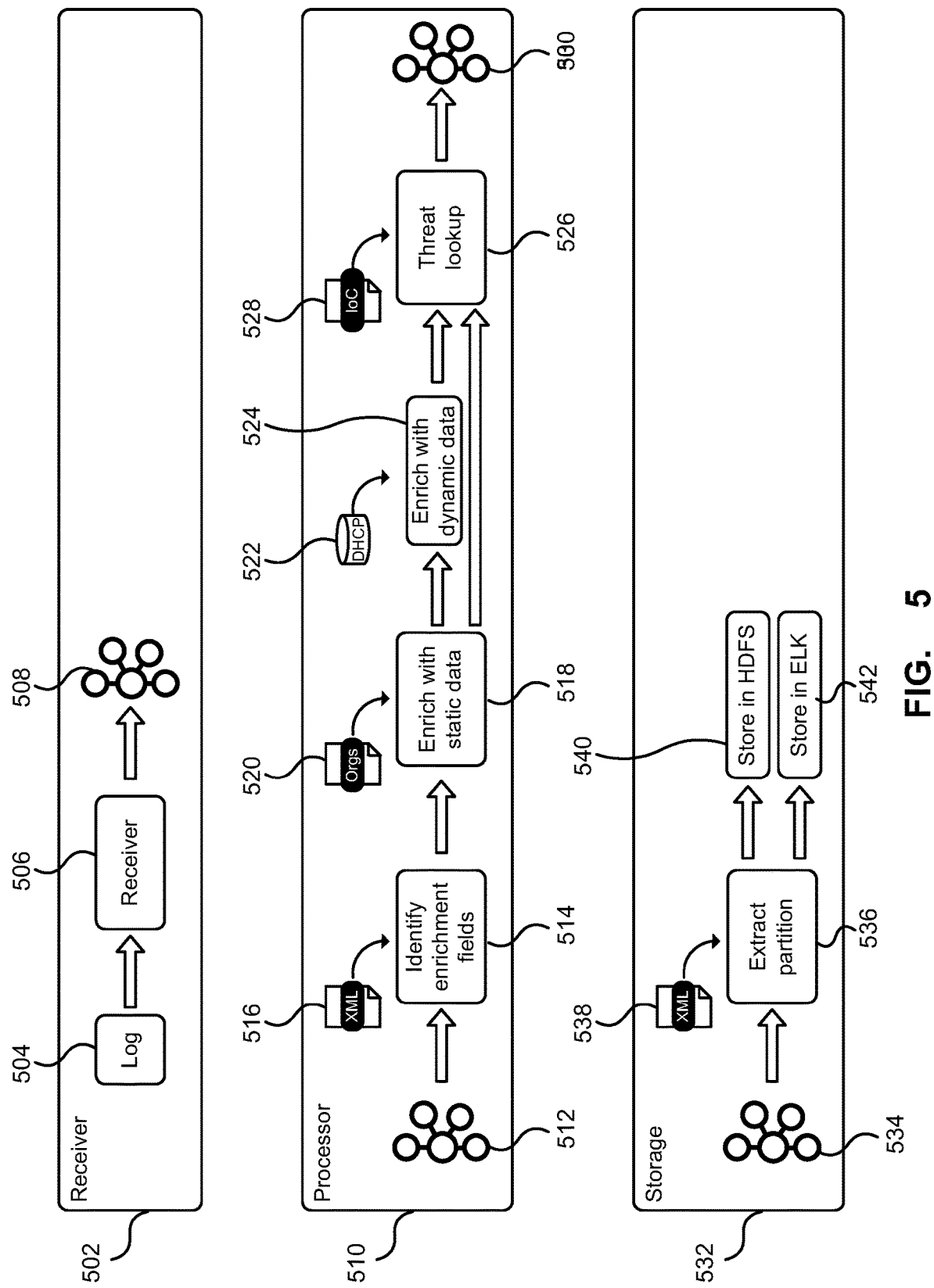
FIG. 5 depicts an illustrative implementation of a cyber-threat intelligence infrastructure.

FIG. 5 depicts an illustrative implementation of a cyber-threat intelligence infrastructure. The implementation depicted in FIG. 5 uses a distributed commit log as a messaging queue to connect receiver components to processing components and storage components. The distributed commit log may be provided by Apache's Kafka. A receiver 520 may process log information 504 or other data sources such as sources of NetFlow data. Receiver functionality 506 may receive and process the information and pass it to the Kafka queue 508. The data in the Kafka queue 508 may be distributed to the Kafka queues 512, 534 of a processor component 510 and storage component 532.

The processor 510 may retrieve data from the queue 512 and enrich the data with particular fields of data 514 that may be specified in an XML or other type of data file 516. The data may also be enriched with static data 518 such as organization information 520. The data may also be enriched with dynamic data 524 such as DHCP information 522. The enriched data may be processed to lookup threats 526 using indicators of compromise (IoC) 528. The resulting processed data may be returned to the Kafka queue 530. The data from the receivers 502 and processors 510 may be retrieved by a storage component 532 from the Kafka queue 534. The storage component 532 may extract partitions 536 from the data according to XML data 538 and may store the data in an ELK (Elasticsearch, Logstach, and Kibana) data stack 542 for searching and for storing in a HDFS (Hadoop Distributed File System) 540.

The implementation of the CTI infrastructure allows the receivers, processors and storage components to be easily scaled and replicated to provide the necessary processing requirements.

Figure 6:
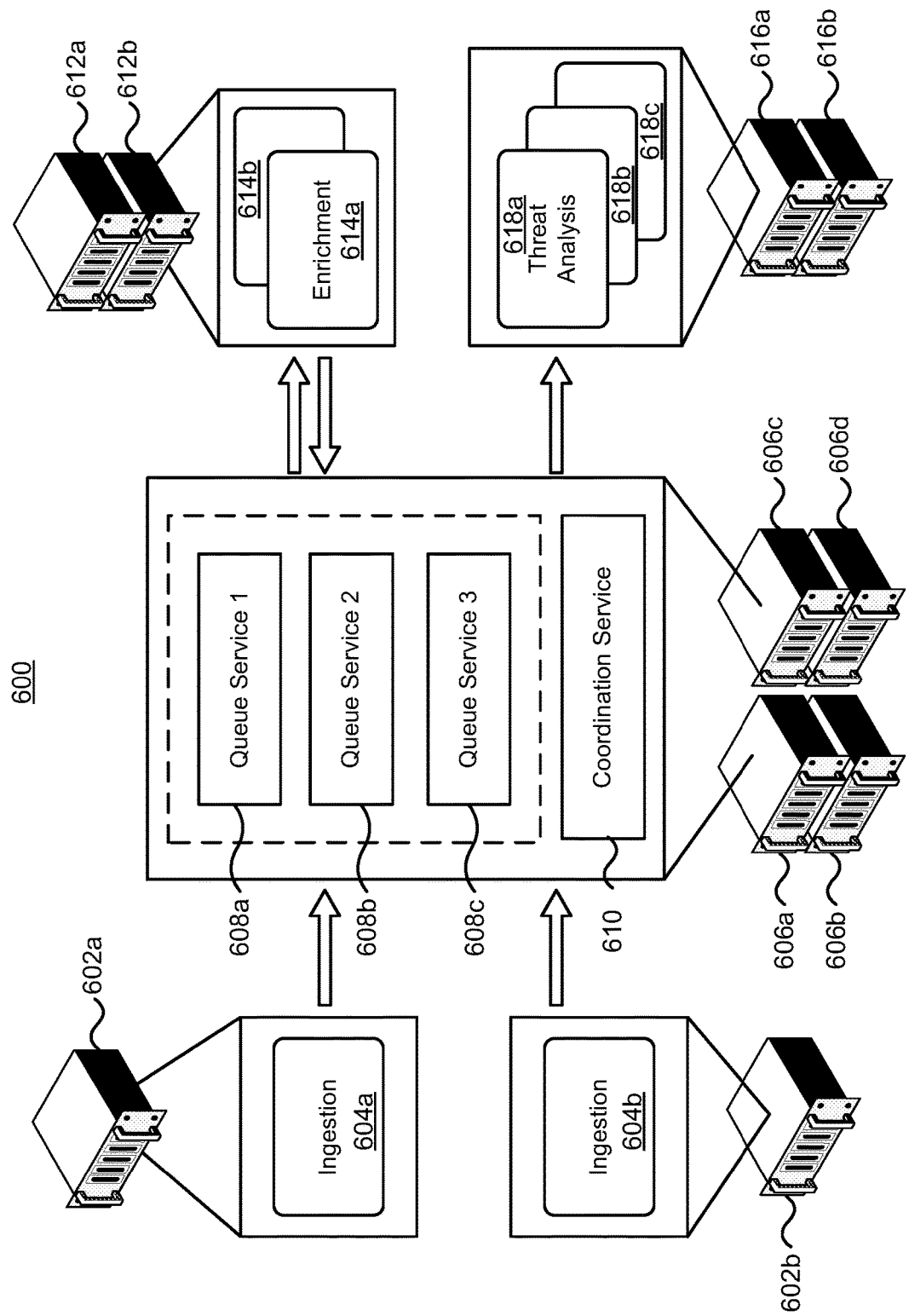
FIG. 6 depicts an implementation of a cyber threat intelligence infrastructure.

FIG. 6 depicts an implementation of a cyber threat intelligence infrastructure. The system 600 comprises a number of different computer systems providing various services.

Although not explicitly depicted in FIG. 6, it will be appreciated that each of the computer systems and services implemented on the systems are communicatively coupled to others by a network. The system 100 may include one or more computer systems 602a, 602b that each implement ingestion components 604a, 604b, that receive network data from network devices (not depicted), format the data and provide the data to a messaging queue service. The messaging queue service is depicted as being provided by a cluster of computers 606a, 606b, 606c, and 606d (referred to collectively as cluster of computers 606). The cluster of computers 606 may provide a distributed queue for storing various different queues across the cluster of computers 606. The distributed queue comprises a plurality of individual queue services 608a, 608b, and 608c (referred to collectively as queue services 608). The individual queue services 608 may be distributed across different computers in the cluster of computers 606 as well as being replicated on different computers in the cluster of computers 606. The distributed queue services 608 may be coordinated by a coordination service 610 that can distribute the queue services 608 across the resources of the cluster of computers 606. The data stored on the distributed queue services 608 may be processed in a number of different ways and by a plurality of different services. The processing may include one or more computers 612a, 612b that provide one or more enrichment services 614a, 614b (referred to collectively as enrichment services 614). The enrichment services 614 may retrieve data from message queues 608, enrich them with external data and provide the enriched data to the queue services 608 for storage in a queue. Similarly, one or more computers 616a, 616b may be used to implement one or more threat analysis components 618a, 618b, 618c (referred to collectively as threat analysis components 618). Although the threat analysis components 618 are depicted as only retrieving data from the distributed queue services 608 it is possible for the threat analysis components 618 to also return data for adding to queue services 608.

Figure 7:
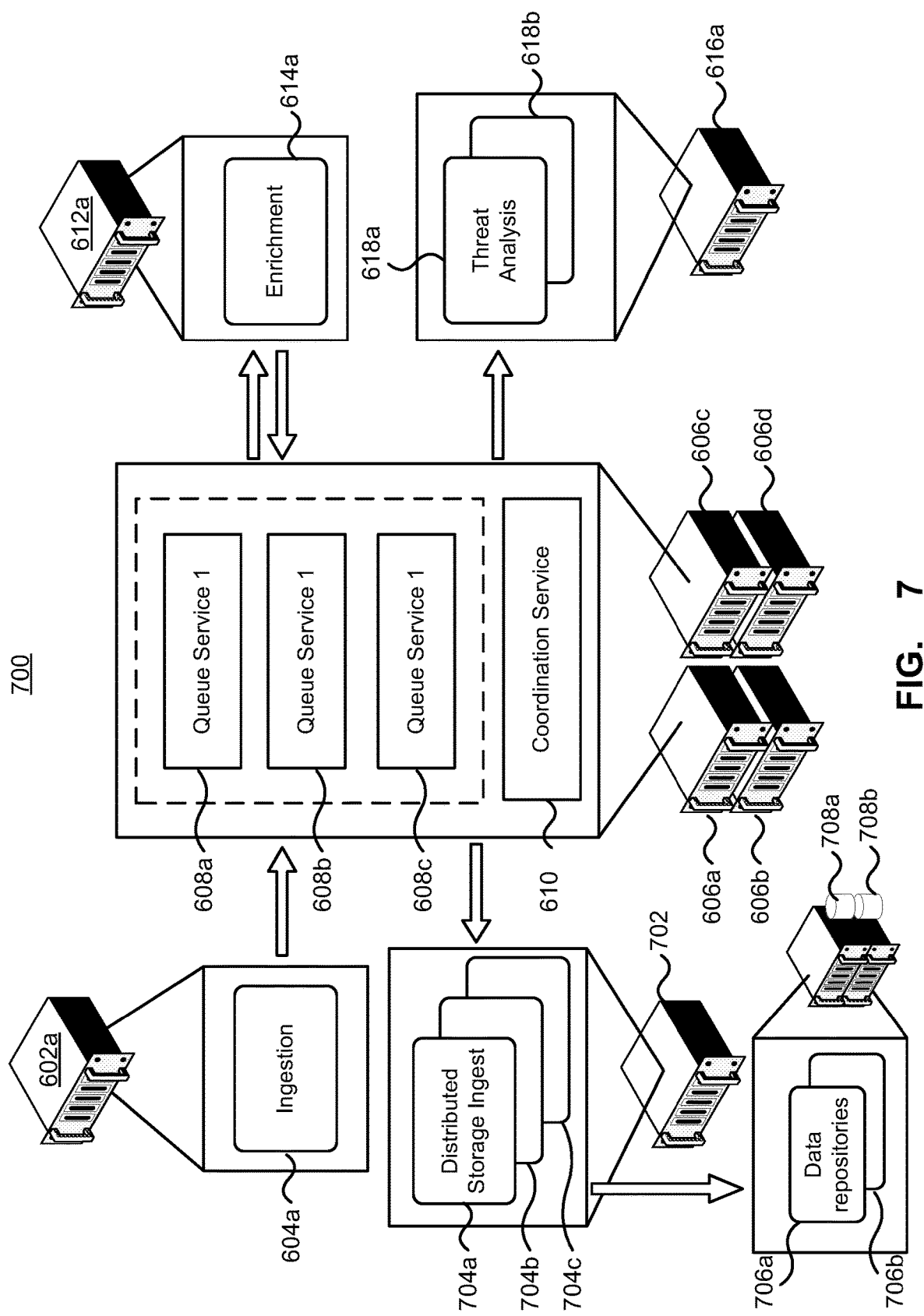
FIG. 7 depicts a further implementation of a cyber threat intelligence infrastructure.

FIG. 7 depicts a further implementation of a cyber threat intelligence infrastructure. The implementation of the infrastructure described above provides flexibility for configuring computing resources based on current loads or processing requirements. For example, network traffic may decrease during the night and as such the computing requirements required for providing ingestion may be lower. Accordingly, the system 700 may include only one computer 602a providing an ingestion service 604a. Similarly, fewer computing resources may be dedicated to data enrichment and threat analysis during the low traffic times. Accordingly, the system 700 may include a computer 612a for providing enrichment services 614 and a computer 616a for providing threat analysis components 618a, 618b. Further, the system 700 is depicted as providing a computer 702 for implementing one or more distributed storage ingestion components 704a, 704b, 704c (referred to collectively as distributed storage ingestion components 704). The distributed storage ingestion components 704 may, for example, use times of times low network traffic in order to store the data from the queue services 608 to one or more data repositories 706a, 706b provided by one or more computers 708a, 708b.

Various specific details have been described above. While certain features or functionality may be described in particular detail with regard to one device or component, it will be appreciated that the functionality or features may be applied to other devices or components. Further, although various embodiments of the devices, equipment, functionality, etc. are described herein, the description is intended to provide an understanding of the systems, methods and devices and as such certain aspects may not be described, or not described in as much detail as other aspects. The described systems, methods and devices are not the sole possible implementations, and the various descriptions, systems, methods and devices herein will enable one of ordinary skill in the art to apply the teachings to other equivalent implementations without exercising any inventive ingenuity.

What is claimed is:

1. A cyber-threat intelligence (CTI) infrastructure comprising:
  a plurality of network devices each collecting network reporting information;
  a collection of at least one CTI server, the collection configured for:
    receiving the network reporting information collected by the plurality of network devices, the network reporting information comprising a plurality of records each comprising an indication of a source and destination of network traffic;
    storing the received plurality of records in a raw record message queue;
    enriching the network reporting information with enrichment data by adding one or more tags of enrichment data to records of the network reporting information comprising, for each of the records of the network reporting information:
      identifying each of a source and a destination of the respective record retrieved from the message queue as a client or a server based at least in part on a portion of the network reporting information comprising one or more a source IP address, a destination IP address, a source port number, and a destination port number;
      tagging the respective record by adding an indication of whether the source and destination is identified as the client or server; and
      storing the enhanced record with the tagged client or server in an enhanced record message queue;
    processing, by one or more real time threat analysis components, the plurality of records in the raw record message queue and the enriched network reporting information of enhanced records stored in the enhanced record message queue comprising the plurality of records with respective sources and destinations tagged as either clients or servers to identify the potential security vulnerabilities;
    wherein each of the one or more real time threat analysis components comprises a model based detection component and one or more of: a predictive detection component, an adaptive detection component, and a rule matching component;
    storing, in a storage component, the enriched network reporting information;
    processing by an offline threat analysis component the stored enriched network reporting information to further identify the potential security vulnerabilities;
    updating the one or more real time and/or offline threat analysis components used to process the enriched network reporting information using the enriched network reporting information;
    providing the identified potential security vulnerabilities to an alert component;
    transmitting from the alert component one or more alerts based on at least one identified potential security vulnerabilities;

processing the enriched network reporting information by running one or more scripts or queries against the enriched network reporting information; and configuring one or more network devices comprising at least one of a firewall and a router based on the results of the one or more scripts or queries.

2. The CTI infrastructure of claim 1, wherein adding one or more tags of the enrichment data further comprises:

determining informational data associated with the portion of the network reporting information from the enrichment data; and adding the determined informational data to the network reporting information as the one or more tags.

3. The CTI infrastructure of claim 2, wherein one or more of the source IP address, and the destination IP address is determined dynamically.

4. The CTI infrastructure of claim 1, wherein the collection of the at least one CTI server is further configured for:

adding the received network reporting information to a first message queue, wherein enriching further comprises:

retrieving network reporting information from the first message queue.

5. The CTI infrastructure of claim 4, wherein the a collection of the at least one CTI server is further configured for:

retrieving the enriched network reporting information from the enhanced record message queue;

further enriching the enriched network reporting information; and adding the further enriched network reporting information to a third message queue.

6. The CTI infrastructure of claim 5, wherein the further enriching comprises one or more of informational data tagging, and dynamic information tagging.

7. The CTI infrastructure of claim 1, wherein the collection of the at least one CTI server is further configured for summarizing the enriched network reporting information for the processing step.

8. The CTI infrastructure of claim 1, wherein the network reporting information comprises one or more of NetFlow data, firewall information, IPFIX data, and DNS data.

9. The CTI infrastructure of claim 1, wherein the network reporting information is received as data from a third-party and from users of the CTI infrastructure and wherein the data from the third-party and from the users of the CTI infrastructure are combined before being stored in the record message queue.

10. The CTI infrastructure of claim 1, wherein the offline threat analysis component is an independent component configured to use scripts and/or queries to further identify the potential security vulnerabilities.

11. A method for processing network information comprising:

receiving the network reporting information collected by the plurality of network devices, the network reporting information comprising a plurality of records each comprising an indication of a source and destination of network traffic;

storing the received plurality of records in a raw record message queue;

enriching the network reporting information with enrichment data by adding one or more tags of enrichment data to records of the network reporting information comprising, for each of the records of the network reporting information:

identifying each of a source and a destination of the respective record retrieved from the message queue as a client or a server based at least in part on a portion of the network reporting information comprising one or more a source IP address, a destination IP address, a source port number, and a destination port number;

tagging the respective record by adding an indication of whether the source and destination is identified as the client or server; and storing the enhanced record with the tagged client or server in an enhanced record message queue;

processing by one or more real time threat analysis components the plurality of records in the raw record message queue and the enriched network reporting information of enhanced records stored in the enhanced record message queue comprising the plurality of records with respective sources and destinations tagged as either clients or servers to identify the potential security vulnerabilities;

wherein each of the one or more real time threat analysis components comprises a model based detection component and one or more of: a predictive detection component, an adaptive detection component, and a rule matching component;

storing, in a storage component, the enriched network reporting information;

processing by an offline threat analysis component the stored enriched network reporting information to further identify the potential security vulnerabilities;

updating the one or more real time and/or offline threat analysis components used to process the enriched network reporting information using the enriched network reporting information;

providing the identified potential security vulnerabilities to an alert component;

transmitting from the alert component one or more alerts based on at least one identified potential security vulnerabilities;

transmitting one or more alerts based on at least one identified potential security vulnerabilities;

processing the enriched network reporting information by running one or more scripts or queries against the enriched network reporting information; and configuring one or more network devices comprising at least one of a firewall and a router based on the results of the one or more scripts or queries.

12. The method of claim 11, wherein adding one or more tags of the enrichment data further comprises:

determining informational data associated with the portion of the network reporting information from the enrichment data; and adding the determined informational data to the network reporting information as the one or more tags.

13. The method of claim 12, wherein one or more of the source IP address, and the destination IP address is determined dynamically.

14. The method of claim 11, further comprising:

adding the received network reporting information to a first message queue, wherein enriching further comprises:

retrieving network reporting information from the first message queue.

15. The method of claim 14, further comprising:

retrieving the enriched network reporting information from the enhanced record message queue;

further enriching the enriched network reporting information; and adding the further enriched network reporting information to a third message queue.

16. The method of claim 15, wherein the further enriching comprises one or more of informational data tagging, and dynamic information tagging.

17. The method of claim 11, further comprising summarizing the enriched network reporting information for the processing step.

18. The method of claim 11, wherein the network reporting information comprises one or more of NetFlow data, firewall information, IPFIX data, and DNS data.

19. The method of claim 11, wherein the network reporting information is received as data from a third-party and from users of the CTI infrastructure and wherein the data from the third-party and from the users of the CTI infrastructure are combined before being stored in the record message queue.

20. The method of claim 11, wherein the offline threat analysis component is an independent component configured to use scripts and/or queries to further identify the potential security vulnerabilities.

* * * * *